No. 660,360. Patented Oct. 23, 1900.
D. H. BURRELL.
CENTRIFUGAL LIQUID SEPARATOR.
(Application filed Nov. 6, 1899.)
(No Model.)
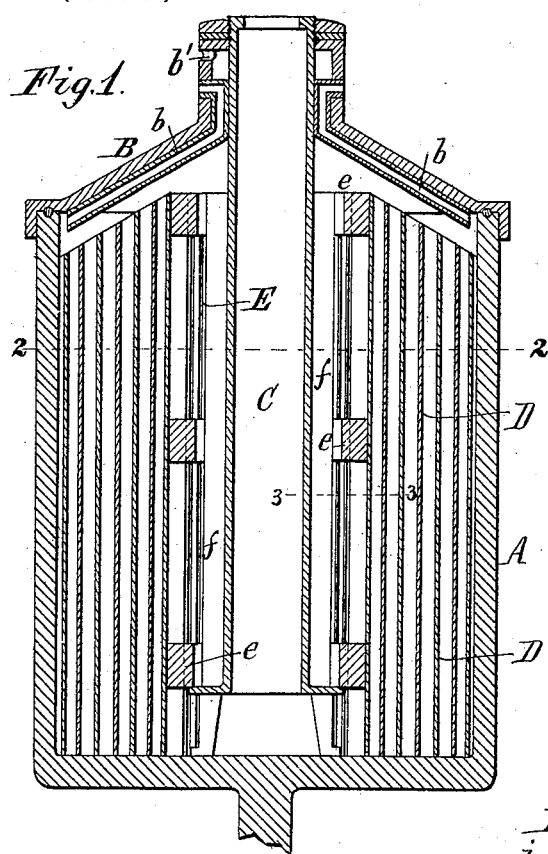
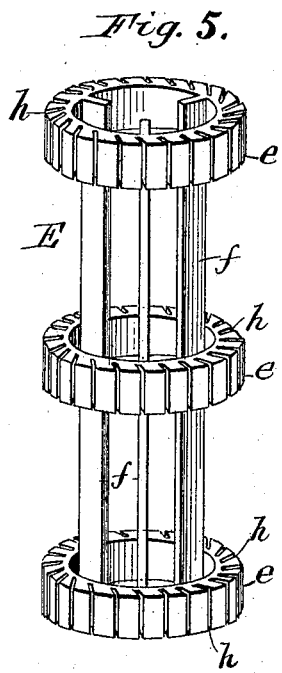
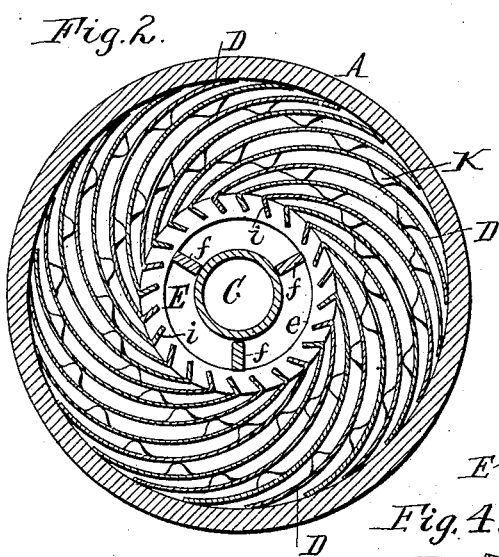
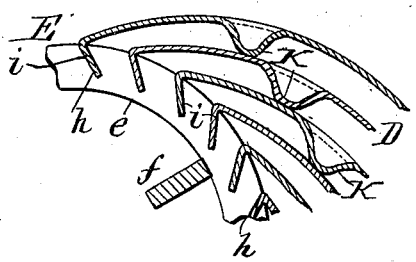
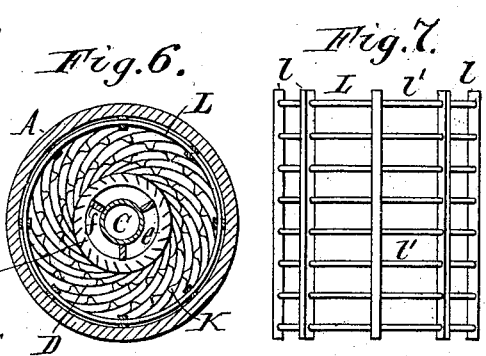
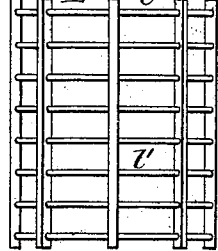
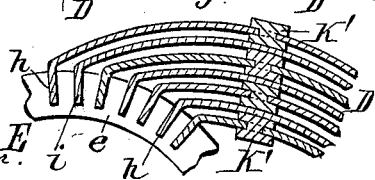
Witnesses:
E. A. Volk
F. F. Schuzinger
D. H. Burrell
Inventor.
By Wilhelm Bonner
Attorneys.
THE NORRIS PETERS CO., PHOTO-LITHO., WASHINGTON, D. C.

UNITED STATES PATENT OFFICE.

DAVID H. BURRELL, OF LITTLE FALLS, NEW YORK.

CENTRIFUGAL LIQUID-SEPARATOR.

SPECIFICATION forming part of Letters Patent No. 660,360, dated October 23, 1900.

Application filed November 6, 1899. Serial No. 736,033. (No model.)

*To all whom it may concern:*

Be it known that I, DAVID H. BURRELL, a citizen of the United States, residing at Little Falls, in the county of Herkimer and State of New York, have invented new and useful Improvements in Centrifugal Liquid-Separators, of which the following is a specification.

This invention relates to the laminate division contrivances which are placed in the liquid-space of centrifugal liquid-separators, particularly centrifugal creamers, for increasing the separating or skimming capacity of the machine and which consist of numerous blades or leaves which are arranged obliquely to the radial line of the bowl and by which the body of liquid is divided into numerous thin layers, which are intersected by the radial line of the bowl.

The object of my invention is to construct the skimming contrivance in such a manner that the blades are held in their proper working position by simple, substantial, and inexpensive means and can be separated from each other for cleaning when the device has been removed from the bowl.

In the accompanying drawings, Figure 1 is a sectional elevation of a separator-bowl provided with my improved skimming contrivance. Fig. 2 is a horizontal section in line 2 2, Fig. 1. Fig. 3 is a fragmentary horizontal section on the same line, but on an enlarged scale, and showing in section the spacing projections formed integrally with the blades. Fig. 4 is a fragmentary sectional view similar to Fig. 3, but showing the blades provided with spacing-rivets and with radial lips instead of oblique lips at their inner ends. Fig. 5 is a perspective view showing the slotted core which receives the inner ends of the blades. Fig. 6 is a horizontal section on a reduced scale, showing a bowl provided with my improved skimming contrivance, which is surrounded by a removable inclosing cage or jacket. Fig. 7 is an elevation of this cage or jacket.

Like letters of reference refer to like parts in the several figures:

A represents the bowl of a centrifugal liquid-separator, which may be of any usual or suitable construction. The bowl is provided with the usual removable cover B, which contains the escape-pipes $b$ for the skim-milk and the cream-discharge $b'$, and with the usual central feed-pipe C, which passes centrally through the neck of the bowl.

D represents the skimming-blades, which are arranged in an upright position in the liquid-space of the bowl. These blades are arranged tangentially or eccentrically around the axis of the bowl and occupy its liquid-space, dividing the body of liquid into numerous thin upright layers, which stand obliquely to the radial lines of the bowl.

E represents a slotted core which surrounds the feed-pipe and which receives the inner ends of the skimming-blades. This core consists, preferably, as shown, of several horizontal rings $e$, which are secured at different heights to the outer edges of vertical radial plates $f$. The latter bear with their vertical inner edges against the feed-pipe C, so that this core can be inserted by slipping it around the feed-pipe or can be removed therefrom when the cover of the bowl has been removed. One of the rings is arranged near the upper ends of the blades and the other near their lower ends, while an intermediate ring is also employed, as shown, when the height of the bowl requires the same. Each ring is provided in its outer face with upright slots $h$, which open outwardly and are of the proper width to receive the inner ends of the blades. Corresponding slots in the different rings are in line with each other, and the inner end of each blade is formed into a lip $i$, which is inserted in corresponding slots of the core. The lip $i$ stands at an angle to the body of the blade and can be readily bent on the same. These blades, in order to be durable in use, are preferably made of somewhat-stiff sheet-steel, and this cannot be curved or curled so short as would be necessary to form a hinge-joint, but admits of the lips $i$ being bent on the blades without difficulty.

The slots in the face of the core and the lips of the blades are preferably arranged obliquely to the radial line of the bowl, as shown, in order to resist the tendency of centrifugal force to drive the lips out of the slots. The slots and lips may, however, be arranged radially, as shown in Fig. 4, although this arrangement is less desirable.

The blades are provided with spacing projections K, which may be formed by indenting the blades, as shown in Figs. 2 and 3, or in any other suitable manner. For instance, as shown in Fig. 4, the spacing projections may be formed by rivets K', which are secured to alternate blades and which stand on the different blades in line from the center toward the circumference to better support the blades. The latter bear against each other by these projections and are thereby prevented when assembled from drawing out of the slots of the core in a radial or outward direction, while the blades are free to be moved in the slots in an edgewise direction.

The outer edges of the blades may rest directly against the peripheral wall of the bowl, as represented in Figs. 1 and 2, or they may rest against an inclosing jacket or cage L, which is removably applied to the outer edges of the blades, as represented in Figs. 6 and 7. This jacket or cage may be constructed in any suitable manner, so as not to obstruct the flow of the liquid. For instance, as shown, it may be composed of upright bars $l$ and horizontal curved rods or rings $l'$.

When the skimming device has been removed from the bowl, the blades can be separated from the core by an edgewise or longitudinal movement of the lip of each blade in the slots of the core, or, if desired, every alternate blade can be so removed when sufficient room is formed between the remaining blades to remove the same from the core by an outward or radial movement. This device is very simple, strong, and durable and permits the blades and their supporting parts to be readily detached from each other for cleaning and to be conveniently assembled for use.

I claim as my invention—

1. In a skimming device for centrifugal liquid-separators, the combination with a core provided in its outer face with slots which are arranged obliquely to the radial line, of an annular series of tangential or eccentric skimming-blades provided at their inner ends with lips which are removably seated in the slots of the core, substantially as set forth.

2. In a skimming device for centrifugal liquid-separators, the combination with externally-slotted rings arranged one above the other, and connecting means whereby said rings are rigidly connected and held apart in alinement one above the other, of an annular series of skimming-blades which are arranged around said wings and have their inner ends removably inserted in the slots of the same, substantially as set forth.

3. In a skimming device for centrifugal liquid-separators, the combination with a core, composed of superposed, externally-slotted rings and upright connecting-plates arranged within said rings and secured thereto, of an annular series of skimming-blades which are arranged around said rings and have their inner ends removably inserted in the slots of the same, substantially as set forth.

Witness my hand this 3d day of November, 1899.

DAVID H. BURRELL.

Witnesses:
GRIFFITH PRICHARD,
G. R. HITCHCOCK.